United States Patent [19]
Morrison

[11] 4,214,786
[45] Jul. 29, 1980

[54] AIR FOIL APPARATUS

[76] Inventor: D. Jon Morrison, 1402 S. 78th St., Omaha, Nebr. 68124

[21] Appl. No.: 33,046

[22] Filed: Apr. 25, 1979

Related U.S. Application Data

[63] Continuation-in-part of Ser. No. 927,469, Jul. 24, 1978.

[51] Int. Cl.² .................................................. B62D 35/00
[52] U.S. Cl. ........................................................ 296/1 S
[58] Field of Search ...................... 296/1 S, 1 R, 91; 180/1 FV

[56] References Cited

U.S. PATENT DOCUMENTS

| | | | |
|---|---|---|---|
| 3,762,758 | 10/1973 | Wilkerson | 296/1 S |
| 4,098,534 | 7/1978 | Wood | 296/1 S |
| 4,116,482 | 9/1978 | Spiegel | 296/1 S |
| 4,131,308 | 12/1978 | Holka et al. | 296/1 S |
| 4,131,309 | 12/1978 | Henke | 296/1 S |

*Primary Examiner*—John J. Love
*Assistant Examiner*—Michael Mar
*Attorney, Agent, or Firm*—Zarley, McKee, Thomte, Voorhees & Sease

[57] ABSTRACT

An air deflector for a vehicle such as a cab-over-engine truck is described comprising a conical-shaped member positioned at the forward end of the truck. The conical-shaped member includes a centrally disposed leading portion designed to deflect the air over the vehicle cab, laterally around both sides of the cab, and downwardly beneath the cab. A pair of wing portions are disposed laterally and rearwardly of the leading portion and have air scoops formed therein for directing the deflected air rearwardly closely along opposite sides of the cab. An opening is formed in the lower central portion of the conical-shaped member forwardly of the truck radiator to enable cooling air to be supplied to the radiator of the truck. A perforated door is pivotally mounted in the opening and is normally positioned in a substantially vertically disposed position when the truck is not moving. The perforated door is pivotally moved upwardly and rearwardly upon wind forces being applied thereto so that the door is then in substantially the same plane as the lower forward portion of the conical-shaped member in which the door is mounted.

10 Claims, 6 Drawing Figures

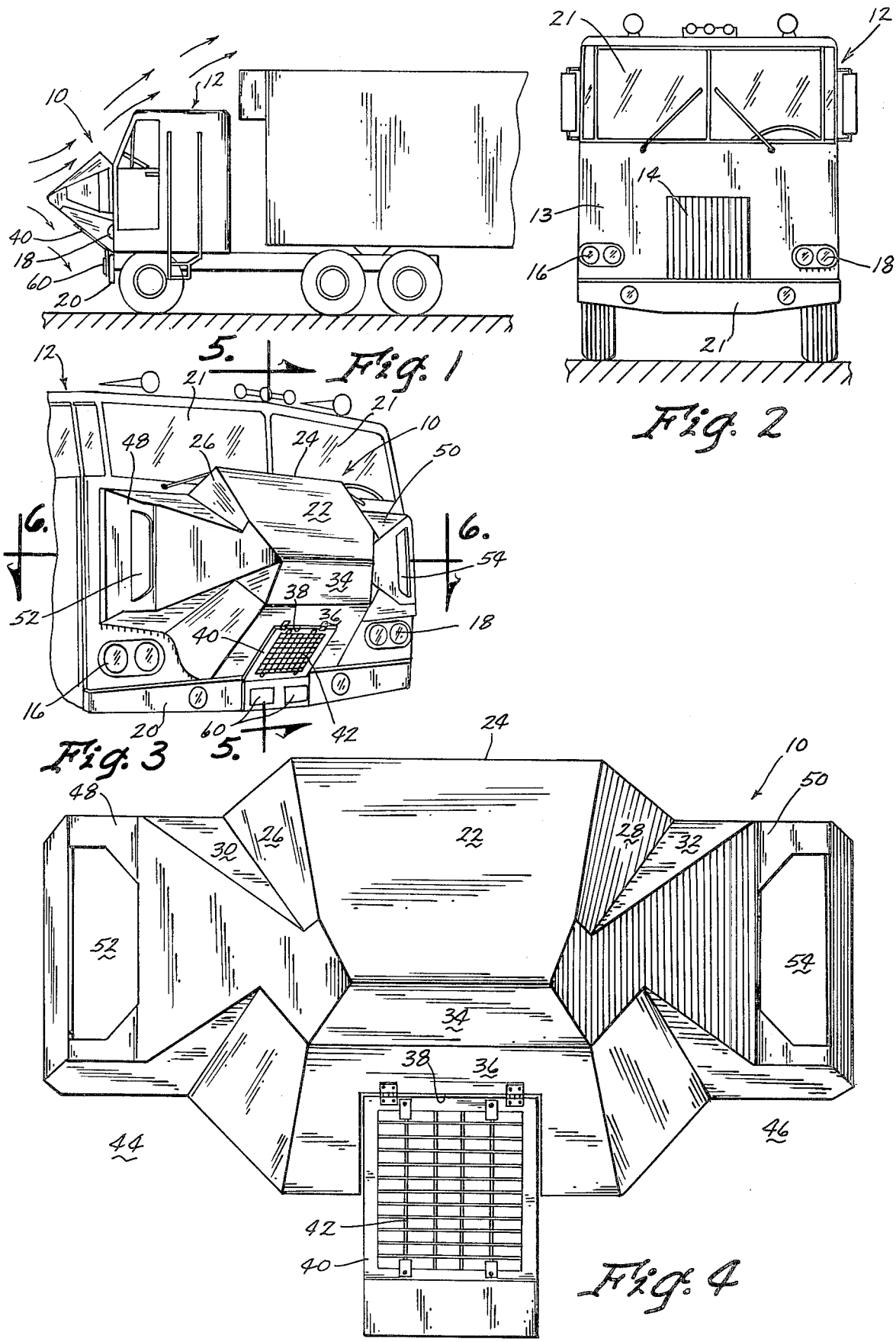

AIR FOIL APPARATUS

BACKGROUND OF THE INVENTION

This is a continuation-in-part application of application Ser. No. 927,469 filed July 24, 1978.

The trucking and recreational vehicle industry has not been overly concerned with the problem of fuel economy until recently when the critical nature of the supply of fuel was brought to their attention by the increased costs for a diminishing supply.

At high speeds, a non-aerodynamical designed cab of a tractor used by the truckers or a blunt nosed recreational vehicle could use alomost 50% of its fuel to overcome air resistance. Unfortunately, a premium is placed on cargo and most truckers operate at substantially the legal length. Many truckers are considering the elimination of the sleeper cab and replacing drivers every eight hours. These remedies however do not reduce fuel requirements but they do increase the weight carried for a certain amount of fuel consumption.

The trucking industry has learned that by redesigning the cab to reduce air resistance, they can possibly reduce fuel consumption as much as 25%. The cost of replacing all cabs would be prohibitive, but a nose cone could present real savings.

In the co-pending application, an inflatable air bag was secured to the forward end of the truck to deflect air around the cab. While the device of the co-pending application has met with some success, the instant invention exhibits many advantages thereover. For example, in applicant's earlier device, the "nose cone" did not cover substantially the entire forward portion of the cab due to the requirements for supplying air to the truck radiator. Likewise, the device of the earlier invention had to be pivotally moved away from the front of the vehicle in order to service the engine of the vehicle.

SUMMARY OF THE INVENTION

This invention relates to an improved air deflector for the forward end a cab-over-engine truck or the like which includes a generally conical-shaped member positioned at the forward end of the truck to deflect air over the vehicle cab, around both sides of the vehicle cab, and beneath the vehicle cab. An opening is provided in the lower portion of the conical-shaped member directly ahead of the truck radiator. A perforated door is pivotally mounted in the opening and normally hangs in a substantially vertically disposed position when the truck is not moving to allow cooling air to be drawn by the radiator fan around the sides of the door as well as beneath the door. As the vehicle speed increases, the perforated door pivots upwardly and rearwardly so as to occupy substantially the same plane as the lower forward portion of the conical-shaped member. A pair of air scoops are provided at opposite sides of the conical-shaped member to direct the deflected air rearwardly closely adjacent opposite sides of the cab.

This invention therefore relates to an improved air deflector for a vehicle.

A further object of the invention is to provide an air deflector for a vehicle which permits the vehicle engine to be conveniently serviced.

A further object of the invention is to provide an air deflector having air scoops at the opposite sides thereof which create a "lift" effect.

A still further object of the invention is to provide an air deflector for a truck which increases the gas mileage of the truck.

A still further object of the invention is to provide an air deflector for a truck including a readily changeable perforated door member therein.

A still further object of the invention is to provide an air deflector for a vehicle such as a truck or the like which insures that sufficient cooling air will be supplied to the truck radiator.

A still further object of the invention is to provide an air deflector for a truck or the like which is economical of manufacture, durable in use and refined in appearance.

These and other objects will be apparent to those skilled in the art.

BRIEF DESCRIPTION OF THE DRAWINGS

FIG. 1 is a partial side view of a truck having the deflector of this invention mounted thereon:

FIG. 2 is a front view of the truck prior to the air deflector being mounted thereon:

FIG. 3 is a front perspective view of the air deflector mounted on a truck:

FIG. 4 is a front view of the air deflector:

DESCRIPTION OF THE PREFERRED EMBODIMENT

Figure 5:
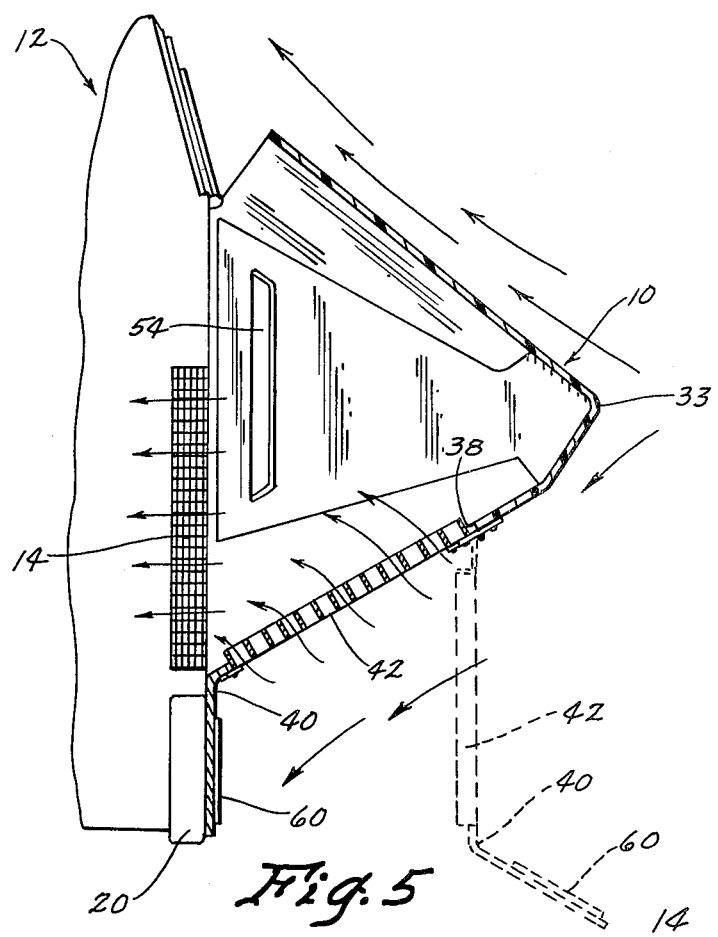
FIG. 5 is a sectional view seen on lines 5—5 of FIG. 3 with the broken lines indicating the normal position of the perforated door.

The numeral 10 refers to the deflector of this invention which is positioned at the forward end of a vehicle cab 11 such as a cab-over-engine truck 12. Vehicle 12 has a substantially vertically disposed forwardly presented forward end portion 13 having a radiator or radiator grill 14 positioned in the lower central portion thereof. Headlights 16 and 18 are also provided adjacent the lower forward corners of forward end portion 13 as illustrated in FIG. 2. Bumper 20 is positioned below the radiator grill 14 while windshield 21 extends across the upper forward end of the truck cab as best seen in FIG. 2.

The configuration of the deflector may best be described as substantially conical-shaped. Deflector 10 includes a first flat surface 22 which extends downwardly and forwardly from upper edge 24. Surfaces 26 and 28 extend downwardly and outwardly or laterally from opposite sides of surface 22 and blend or merge into surfaces 30 and 32 respectively. Surface 34 extends downwardly and rearwardly from the lower end of surface 22. Surface or wall portion 36 extends downwardly and rearwardly from surface 34 and is provided with an opening 38 formed therein to permit the door 40 to be pivotally mounted therein. Door 40 is pivotally mounted at its upper end to the deflector and normally dwells in the position illustrated by broken lines in FIG. 5 when the vehicle is stopped. As will be described in more detail hereinafter, door 40 includes a removable insert 42 positioned therein.

Figure 6:
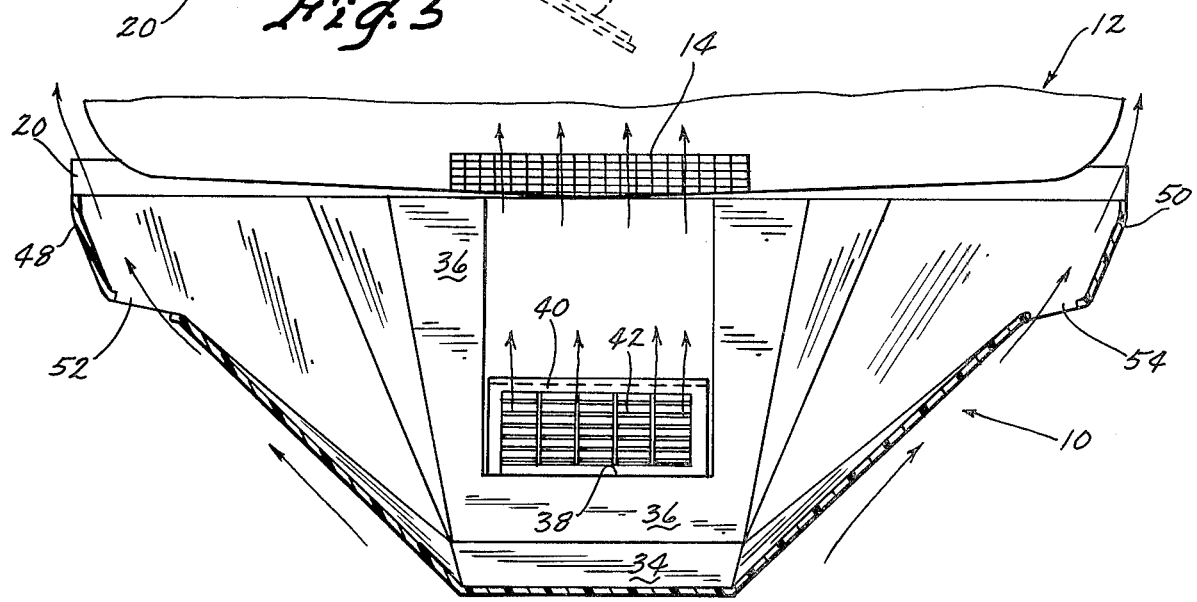
FIG. 6 is a sectional view seen on lines 6—6 of FIG. 3.

Deflector 10 is provided with cut-away portions 44 and 46 to permit the headlights to be exposed. Surfaces 56 and 58 extend laterally outwardly and rearwardly from the center portion of the deflector as seen in FIG. 4 and merge into wings 48 and 50 respectively. Wings 48 and 50 have scoop openings 52 and 54 provided therein. Air is deflected by the deflector laterally along the surfaces 56 and 58 as indicated by the arrows in FIG. 6 so that the deflected air enters the scoop openings 52 and 54 and is deflected around the side of the cab as illustrated in FIG. 6. The air being deflected by the surfaces 56 and 58 is directed onto the inside surface of the wings 48 and 50 as illustrated in FIG. 6. Wings 48 and 50 dwell in a plane different than the surfaces 56 and 58 so that the direction of the deflected air is changed to a more rearwardly direction so as to be more closely parallel to the sides of the vehicle cab to disrupt or eliminate the vacuum ordinarily present along the sides of the cab. A further phenomenon in the impingement of air at the inside surfaces of the wings 48 and 50 is that a small amount of "lift" is created as the air leaves the rearward end of the wings 48 and 50 which apparently creates a pulling effect on the vehicle.

Door 40 is pivotally secured to the deflector 10 as previously described adjacent its upper end so that the door will hang in substantially vertically disposed position as illustrated by broken lines in FIG. 5 when the vehicle is not moving. With the door 40 hanging in the vertically disposed position, the radiator is able to draw air not only through the perforations in the door but around the sides of the door and beneath the door to prevent overheating of the engine. As the vehicle begins to move, air pressure against the door 40 will swing the door upwardly and rearwardly to the position illustrated by solid lines in FIG. 5. It can be seen in FIG. 5 that the forwardly presented surface of door 40 is substantially parallel to the lower forward end of the deflector or substantially parallel to wall 36 so that the door 40 aids in deflecting the air downwardly from the leading portion 33 in a smooth substantially uninterrupted fashion. The openings or perforations in the insert 42 not only permit air to be passed rearwardly to the radiator but also serve to deflect the air upwardly into the radiator. The desirability of having an insert 42 is that inserts having less perforations or openings formed therein may be employed during the winter months. It should be noted that engagement of the lower end of the door 40 with the bumper 20 limits the rearward pivotaly movement of the door 40 as the vehicle is moved along the road. The lower end of the door 40 also serves as means for mounting license plates 60 thereon. A tremendously important feature of the door 40 is that when the door 40 hangs in the vertical position illustrated by broken lines in FIG. 5, a person may stand in the opening 38, behind door 40, to service the vehicle inasmuch cab-over-engines normally are serviced from the forward portion thereof.

Thus it can be seen that a novel air deflector has been provided for the forward portion of a vehicle such as a cab-over-engine which not only substantially reduces the drag at the forward portion of the vehicle but also serves to disrupt or disturb the vacuum normally present at opposite sides of the cab. It is believed that the vacuum normally present at opposite sides of the cab tends to create additional drag on the vehicle which does reduce gasoline mileage. Perhaps the single most important feature of applicant's invention is the door 40 and its pivotal relationship to the cone. The fact that the door 40 hangs in the vertically disposed position illustrated by broken lines in FIG. 5 during the times that the vehicle is stationary insures that sufficient cooling air will be supplied to the radiator. An extremely important feature is that an attendant or the like may service the vehicle engine by simply standing in the opening 38.

Thus it can be seen that the invention accomplishes at least all of its stated objectives.

I claim:

1. In combination,
a cab-over-engine type vehicle including a cab having a forwardly presented front end portion, opposite side portions and a roof portion, said front end portion having a radiator grill means mounted therein at the lower central portion thereof, said front end portion having a windshield mounted therein at the upper end thereof,
an air deflector means mounted on said vehicle forwardly of said front end portion for deflecting air around the sides of said front end portion, over said roof portion of said front end portion, and below the lower forward end of said cab,
said air deflector means comprising a cone means having a leading portion which is spaced substantially forwardly of said front end portion, said cone means including a lower central wall which extends downwardly and rearwardly from said leading portion,
said lower central wall having an opening formed therein positioned forwardly of said radiator grill means,
a perforated door means movably positioned in said opening, said door means being pivotally movable about its upper end, front first to second positions with respect to said lower central wall,
said door means normally being in said second position when the vehicle is not moving,
said door means, when in its said second position, dwelling in substantially a vertical plane so that the lower end thereof is spaced forwardly of said opening to permit a person to enter said opening to service the vehicle,
said door means extending downwardly and rearwardly from its upper end when in its first position to enhance the deflection of air downwardly from said leading portion, the perforations in said door permitting some of the air passing over said door means to pass therethrough towards said radiator grill means,
said door means normally being positioned in said second position until sufficient wind force is encountered to move said door means to its said first position.

2. The combination of claim 1 wherein said door means is substantially parallel to said lower central wall when in its said first position.

3. The combination of claim 1 wherein the perforations in said door means serve to deflect cooling air rearwardly and upwardly from the forward surface of said door means when said door means is in its first position.

4. The combination of claim 1 wherein said door means includes a removable perforated insert.

5. The combination of claim 1 wherein said door means has an area at the lower forward end thereof below the lower forward end thereof below the perforations formed therein for supporting license plates thereon.

6. The combination of claim 1 wherein said vehicle has a front bumper, the lower end of said door means engaging said front bumper when in its said first position.

7. The combination of claim 1 wherein said vehicle has headlights positioned at the lower forward end of said cab adjacent the sides thereof, said cone means having cut-away portions formed therein for exposing said headlights.

8. The combination of claim 1 wherein said cone means has wing portions spaced laterally and rearwardly of said leading portion, each of said wing portions having an air scoop opening formed therein for directing the deflected air rearwardly along the respective side of the cab in a direction substantially parallel to the longitudinal axes of the vehicle.

9. The combination of claim 8 wherein said wing portions dwell in a plane different than the deflecting surface of the cone means adjacent thereto so that a lift effect is created by air passing through said scoop openings.

10. In combination,
- a cab-over-engine type vehicle including a cab having a forwardly presented front end portion, opposite side portions and a roof portion, said front end portion having a radiator grill means mounted therein at the lower central portion thereof, said front end portion having a windshield mounted therein at the upper end thereof, said cab having a bumper positioned below said grill means,
- an air deflector means mounted on said vehicle forwardly of said front end portion for deflecting air around the sides of said front end portion, over said roof portion of said front end portion, and below the lower forward end of said cab,
- said air deflector means comprising a cone means having a leading portion which is spaced substantially forwardly of said front end portion, said cone means including an upper central wall extending upwardly and rearwardly from said leading portion; first and second upper wall portions extending laterally and rearwardly from opposite sides of said leading portion; first and second lower wall portions extending laterally and rearwardly from opposite sides of said leading portion; a first intermediate wall portion between said first upper and lower wall portions extending laterally and rearwardly from said leading portion; a second intermediate wall portion between said second upper and lower wall portions extending laterally and rearwardly from said leading portion; and a lower central wall extending downwardly and rearwardly from said leading portion between said lower wall portions,
- said lower central wall having an opening formed therein positioned forwardly of said radiator grill means,
- said opening being positioned forwardly of said bumper and being sufficiently large enough to permit a person to stand upon the ground or other supporting surface forwardly of said bumper and to enter said opening to service the vehicle.

* * * * *